United States Patent Office 2,696,481
Patented Dec. 7, 1954

2,696,481

PREPARATION OF LINEAR POLYMERS FROM DISALICYLIDE AND THE LIKE, AND THE FIBER-FORMING POLYMERS SO PREPARED

Allan K. Schneider, Wilmington, Del., assignor to E. I. du Pont de Nemours & Company, Wilmington, Del., a corporation of Delaware No Drawing. Application June 5, 1951,
Serial No. 230,080

2 Claims. (Cl. 260—47)

This invention relates to polymeric materials and, more particularly, to linear polymers of o-hydroxy aromatic monocarboxylic acids possessing improved properties and to a process for preparing them.

Low molecular weight polymeric materials have been formed as a by-product in the manufacture of aspirin (acetylsalicylic acid) and as an intermediate in the formation of disalicylide from acetylsalicylic acid. However, the resulting polymeric materials have been too brittle and have possessed too low inherent viscosities to be useful for the formation of self-supporting films and fibers, and were not drawable to impart increased flexibility and strength. These polymers have possessed inherent viscosities of less than 0.05, indicating that such products have extremely low molecular weights.

It is an object of this invention to prepare polymers of o-hydroxy aromatic monocarboxylic acids of sufficiently high molecular weight to form self-supporting films and fibers. Another object of the invention is to provide linear polymers of o-hydroxy aromatic monocarboxylic acids which can be drawn to impart greater flexibility and strength. A further object is to provide a process for producing such polymers. Other objects of the invention will become apparent from the following description and the appended claims.

It has now been found that novel film-forming linear polymers of o-hydroxy aromatic monocarboxylic acids, having inherent viscosities greater than 0.1, are provided by heating a cyclic ester of an o-hydroxy aromatic monocarboxylic acid in the presence of a catalytic amount of a polyvalent heavy metal oxide, added as such or as a salt of such metal capable of being thermally converted to the oxide under the reaction conditions, at a temperature above the melting point of the cyclic ester, and preferably at a temperature between 200° and 240° C. Shaped articles formed from the preferred polymers of this invention are drawable at elevated temperatures, but below the melting point of the polymer, e. g., at temperatures between about 100° and 160° C. The resulting drawn polymer possesses increased flexibility and tensile strength in comparison with the undrawn polymer. Generally this property of drawability does not appear until the inherent viscosity of the polymer is at least 0.2 (determined in 0.5% solution in metacresol at 25° C.); and when the inherent viscosity of the polymer reaches 0.45 the drawn polymer begins to show orientation by X-ray diffraction analysis.

The preferred polymers of this invention are linear polymers having recurring structural units represented by the following formula

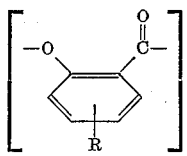

in which R is hydrogen or alkyl. The especially preferred polymers are those having recurring units of the above formula in which R is hydrogen or an alkyl radical of 1 to 4 carbon atoms.

A preferred method for preparing the polymers of this invention consists in heating a cyclic ester of an o-hydroxy aromatic monocarboxylic acid, e. g., salicylide or o-cresotide, with from 0.01% to 10% and preferably from 0.02% to 0.10%, based on the weight of cyclic ester, of a polyvalent heavy metal oxide or salt of such metal capable of being thermally converted to the oxide under the polymerization conditions e. g., litharge, lead stearate, or cobalt stearate, in an evacuated, closed reaction vessel at a temperature above the melting point of the cyclic ester, generally from 190° to 250° C. and preferably between 200° to 240° C. Polymerization is continued until a polymer of the desired inherent viscosity is obtained.

As indicated above, the polymerization can be carried out at any temperature above the melting point of the cyclic ester of the o-hydroxy aromatic monocarboxylic acid. While 200° is preferably the lower polymerization temperature, it is sometimes feasible to use slightly lower temperatures, e. g., 190° C. In some cases polymerization can be obtained by the use of temperatures of 185° to 190° C. when a solvent or plasticizer for the cyclic ester is employed. Temperatures above 250° C. e. g., 270–285° C., can be used, but are not as desirable because of the tendency of the polymer to be degraded to the monomer at such high temperatures. For these reasons, best results are obtained when the polymerization is carried out at temperatures of 200° to 240° C.

While it is preferable to carry out the reaction of this invention in a closed, evacuated reaction vessel, polymerization can be obtained at atmospheric pressure with the polymerization system blanketed by an inert gas such as, for example, nitrogen.

The cyclic esters of o-hydroxy aromatic monocarboxylic acids, used as starting materials in the process of this invention, are made by conventional methods. For example, disalicylide (formerly known as α-disalicylide) and trisalicylide (formerly known as β-disalicylide) can be prepared by heating acetylsalicylic acid at 150° to 180° C. until acetic acid is given off and then heating the product at high temperature, e. g., 280° to 330° C., and low pressure to distill the 8- and 12-membered cyclic esters. The 8-membered cyclic ester, disalicylide, and the 12-membered cyclic ester, trisalicylide, are isolated by fractional crystallization. The higher salicylides, e. g., tetra- and hexa-salicylides, which are also useful in this invention, can be prepared by dehydration of salicylic acid with phosphorus oxychloride in toluene. Mixtures of these different salicylides in any proportions are also operable in the process of this invention.

This invention is further illustrated by the following examples, in which the proportions of ingredients are expressed in parts by weight unless otherwise noted.

*Example I*

Three parts of disalicylide is heated in a sealed, evacuated reaction vessel with about 0.003 part of litharge as catalyst. After 2 hours at 240° C. the temperature is increased to 270° C. after a total heating time of 25 hours during which the temperature reaches 285° C., there is obtained a tan-colored, transparent polymer. This polymer, polysalicylic acid, is soluble in phenol, in dimethylformamide, and in methylene chloride but is insoluble in chloroform, benzene or acetone. The polymer has a softening point of about 155–165° C. (measured as the stick or tack point on a heated metal block). It has an inherent viscosity (the natural logarithm of the relative viscosity of a dilute solution of the polymer in a solvent at 25° C., divided by 0.1) of 0.10, measured at 0.5% concentration in m-cresol. This polymer can be pressed into a transparent film at a temperature of 200° C. and it can be manually spun into self-supporting but brittle fibers.

*Example II*

Three parts of disalicylide is heated in a closed, evacuated reaction vessel with 0.006 part of lead stearate for 48 hours at 230–235° C. The resulting polysalicylic acid is a light-colored, tough polymer having an inherent viscosity of 0.20, measured at 0.5% concentration in m-cresol at 25° C. Self-supporting films pressed from this polymer can be drawn about 300% after immersion in an oil bath at 150–155° C. The resulting drawn film is tougher and stronger than the original undrawn film.

Example III

Two parts of tri-salicylide and about 0.002 part of litharge are heated in a closed reaction vessel in a metal bath at 215–225° C. for 16 hours. The resulting polymer is tan-colored polysalicylic acid having an inherent viscosity of 0.13, measured at 0.5% concentration in m-cresol at 25° C. The polymer can be manually spun into fibers and pressed into films at 190° C. The pressed films are colorless and transparent.

Example IV

A mixture of 4 parts of tri-salicylide and 0.0025 part of lead stearate is heated for 88 hours at 205–210° C. in a sealed, evacuated reaction vessel. At the end of this time there is obtained a tough, nearly colorless polymer, polysalicylic acid, having an inherent viscosity, measured in 0.5% concentration in m-cresol at 25° C., of 0.45. The inherent viscosity of this polymer measured in methylene chloride at 25° C. is 0.56. This polymer is soluble in methylene chloride, m-cresol and dimethylformamide. Solutions of this polymer in methylene chloride can be cast to form clear transparent self-supporting films. The polymer can also be pressed into clear transparent films at a temperature of 190° C. Pressed films immersed in hot oil at 150–155° C. can be drawn 300% and the drawn films have greater flexibility and strength than the undrawn films.

Example V

A mixture of 0.5 part of di-o-cresotide and 0.0002 part of lead stearate is polymerized by a method similar to that used in the preceding examples by heating the mixture at 235°–245° C. for 90 hours. The resulting polymer is poly-o-cresotic acid.

The examples have illustrated the polymers of this invention by describing the preparation of polysalicylic and poly-o-cresotic acids. However, polymers of other o-hydroxy aromatic monocarboxylic acids having inherent viscosities of at least 0.1 are prepared in a similar manner from the cyclic esters of these acids. Another example of the polymers included by this invention is poly-o-thymotic acid prepared from di-o-thymotide. Modified polymers are prepared in the same way by copolymerizing cyclic esters of o-hydroxy aromatic monocarboxylic acids with minor amounts of other polymerizable cyclic esters having 6 to 8 members in the ring, such as for example, lactide, glycolide, diphenyl glycolide, delta-valerolactone, trimethylene carbonate, ethylene oxalate, propylene oxalate, and the like. This invention includes all of the above types of polymers and the process for preparing them.

In addition to the catalysts mentioned in the examples, the process of this invention can be catalyzed by any polyvalent heavy metal oxide or a salt of such metal capable of being thermally converted to the oxide under the polymerization conditions. Specific examples of other oxides and salts that are operable include basic lead carbonate, cobalt stearate, antimony oxide, lead trifluoroacetate, nickel molybdite, and the like. Lead oxides and lead salts are especially suitable because of their high activity in producing polymers of high inherent viscosity. These catalysts are used in concentrations of from 0.01% to 10%, preferably from 0.02% to 0.10%, of the weight of the monomer. Higher concentrations are operable but are less desirable since they cause more color in the polymer.

The polymers of this invention are useful in various applications such as, for example, the manufacture of fibers and self-supporting films and for plastics. They are also useful as modifiers for other polymers.

As many different embodiments of the present invention may be made without departing from the spirit and scope thereof, it is to be understood that the invention is not limited to the specific embodiments disclosed except to the extent defined in the appended claims.

What is claimed is:

1. The process which comprises heating at a temperature of 200° to 240° C., in the presence of 0.02 to 0.1% of a catalyst selected from the group consisting of oxides of lead, cobalt, antimony and nickel and salts thereof thermally convertible to the metal oxide at the temperature at which the reaction is carried out, a cyclic ester selected from the group consisting of disalicylide, tri-salicylide, di-o-thymotide, and diesters represented by the formula

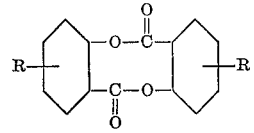

in which R represents an alkyl radical of 1 to 4 carbon atoms, said heating being continued until a linear polyester having an inherent viscosity of at least 0.2, determined in 0.5% solution in metacresol at 25° C., is obtained.

2. A linear polyester composed solely of structural units present in a cyclic ester of the group consisting of disalicylide, trisalicylide, di-o-thymotide, and diesters represented by the formula

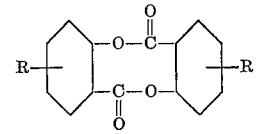

in which R represents an alkyl radical of 1 to 4 carbon atoms, said polyester having an inherent viscosity of at least 0.2, determined in 0.5% solution in metacresol at 25° C., and being capable of being formed into drawable self-supporting films and fibers.

References Cited in the file of this patent

UNITED STATES PATENTS

| Number | Name | Date |
|---|---|---|
| 2,121,475 | Corkery | June 21, 1938 |
| 2,320,817 | D'Alelio | June 1, 1943 |
| 2,600,376 | Caldwell | June 17, 1952 |

FOREIGN PATENTS

| Number | Country | Date |
|---|---|---|
| 344,034 | Germany | Nov. 12, 1921 |